United States Patent Office 3,764,342
Patented Oct. 9, 1973

3,764,342
PRESERVATION OF BEER
Frede B. Strandskov, North Caldwell, N.J., and Henry L. Ziliotto, Wantagh, Long Island, N.Y., assignors to The F. & M. Schaefer Brewing Co., Brooklyn, N.Y.
No Drawing. Filed Jan. 17, 1969, Ser. No. 792,166
Int. Cl. C12h 1/00
U.S. Cl. 426—151
5 Claims

ABSTRACT OF THE DISCLOSURE

Undesirable microbial growth in foodstuffs and beverages and in particular in finished beer is prevented by the utilization, as an additive to the foodstuff or beverage of a mixture of (a) the heptyl or octyl ester of parahydroxybenzoic acid or an alkali metal or alkaline earth metal salt thereof and (b) octyl gallate or an alkali metal or alkaline earth metal salt thereof.

---

The present inventors have discovered that foodstuffs and beverages in general can be preserved against undesirable microbial growth by incorporating into the materials a novel composition comprising octyl gallate or a salt thereof and heptyl or octyl parahydroxybenzoate or a salt thereof.

The present invention is concerned specifically with the control of micro-biological growth in finished packaged beer and ale with the novel preservative composition.

It is a desideratum in the beer-making art to eliminate the necessity for the pasteurization and/or refrigeration of beer. This is due to both the deleterious effects of the pasteurization on the properties of the beer as for example on the taste, as well as to the realization of savings in cost per unit of production.

Beer may be preserved against microbial growth and spoilage thus prevented, by addition to the finished beer of the heptyl or octyl ester of parahydroxybenzoic acid or an alkali metal or alkaline earth metal salt thereof as disclosed in U.S. Pat. No. 3,175,912. The discovery of the use of these compounds in preserving beer represents a great advance in the art of beer making and provides a means by which disadvantages attendant upon the pasteurization and/or refrigeration of the beer are avoided.

The present invention is a further advance in the preservation of beer and, in the first aspect, it is based on the discovery that the preservation of beer may be accomplished and that undesirable microbial growth may be prevented by means of the heptyl or octyl ester of para-hydroxybenzoic acid or an alkali metal or alkaline earth metal salt thereof in conjunction with octyl gallate (n-octyl-3,4,5-trihydroxybenzoate) or an alkali metal or alkaline earth metal salt thereof. This combination of additives renders it possible to obtain the desirable attributes incident to the chemical preservation of beer as set forth above while minimizing any undesired effects flowing from the individual use thereof.

In accordance with this invention the preservation of beer is achieved by incorporating into the beer for intimate admixture therewith a combination of (a) a compound of the formula

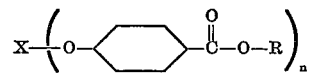

wherein

X represents hydrogen, alkali metal (e.g. sodium potassium, etc.) or alkaline earth metal (e.g. calcium);
$n$ is an integer equal to the valence of X; and
R represents octyl or heptyl, e.g. n-octyl or n-heptyl; and (b) octyl gallate or an alkali metal salt thereof (e.g. sodium, potassium, etc.) or an alkaline earth metal salt thereof (e.g. calcium, etc.).

The preservation of finished beer with octyl gallate alone or with the para-hydroxybenzoic acid ester compounds previously referred to alone, is sometimes not feasible because, inter alia, the comparatively large amount of the materials necessary to achieve preservation for a satisfactory length of time can have a tendency to create adverse effects upon the quality of the finished beer product.

In accordance with the present invention it has been discovered that when utilized in combination with the para-hydroxybenzoic acid ester compounds referred to above, not only is the amount of the octyl gallate necessary for preservation reduced to an acceptable level, but also the amount of the para-hydroxybenzoic acid ester compound is more than correspondingly reduced. That is, the compounds when employed in conjunction with each other display a synergistic action. Thus, the magnitude of preservation obtained with a given amount of the mixture of the materials exceeds the sum of the magnitudes of preservation obtained individually by the component parts of the mixture. It has additionally been found in accordance with the present invention that the mixture of the compounds results in a finished beer product having extremely good foam retention properties notwithstanding the fact that it has been previously recognized in the art that the para-hydroxybenzoic acid ester compounds alone have a tendency to adversely affect the properties of the finished beer product in which they are employed.

The method of this invention comprises incorporating a mixture of octyl gallate, or its salt as enumerated above, and the para-hydroxybenzoic acid compound into the beer in an amount sufficient to prevent undesirable microbial growth and thus prevent spoilage of the product, even in long storage prior to consumption. The octyl gallate and para-hydroxybenzoic acid ester compound can be added to the beer in the proper amounts individually. Alternatively, a stock solution can be prepared containing the proper ratio of the components and the proper amount of this stock solution added to the beer. The latter alternative is more convenient and it is thus preferred.

The additives are incorporated into the beer at any time during the preparation, provided that they will not interfere with a subsequent processing stage in the beer manufacture, and provided that a further processing stage will not interfere with their effectiveness in the beer. It is advantageous to add them to the finished beer. The term "finished" beer in the instant specification refers to beer which contains all the necessary additives to make it a commercially acceptable product and which has been subjected to polish filtration. The components may be added to the beer in any form. It is preferred to add them in the form of a stock solution wherein the components are dissolved in a solvent which itself has no deleterious effects upon the beer. This may be, for example, propylene glycol, ethanol, an aqueous alkaline solution, and the like.

The amounts of the components utilized in this invention vary over a range depending upon the type of beer being preserved and upon the magnitude of preservation to be obtained. In general the amounts of the individual components utilized will lie below the amount of such component necessary to achieve preservation when used alone. The octyl gallate compound is employed in an amount ranging from about 5 to about 20 parts by weight per million parts by volume of the finished beer product (p.p.m.). It is preferred that it be employed in an amount of from about 6 to about 15 p.p.m. The amount of the para-hydroxybenzoic acid ester compound used will likewise vary depending upon the level of preservation desired and the type of beer employed. It will also vary depending upon the specific compound employed. In general, however it is used in the amount of from about 5 to about 10 p.p.m.; an amount of from about 6 to about 10 p.p.m. being preferred.

The generic term "beer' in the instant specification and claims includes, e.g. bock beer, porter and stout as well as lager; ale and malt liquor are also intended. Further, the said generic term applies also to concentrated and reconstituted beers. Additionally, it is of no consequence how the beer is packaged, e.g. in cartons, bottles, cans, kegs or tank trucks; the present invention applies in each case.

Throughout the entire disclosure the relationship between parts by weight and parts by volume is the same as that between grams and milliliters (ml.). Parts per million (p.p.m.) are uniformly parts by weight of additament per million parts by volume of finished product. The type of beer used in the examples is the same throughout.

The examples set forth hereinafter are illustrative of the invention and are not to be considered exhaustive or limitative thereof.

From the regular production line fill each of a group of clean 12 ounce (oz.) brown beer bottles with 12 oz. of cold, unpasteurized finished beer into which no microbiological preservative has been incorporated. Foam up the beer to expel head space air, and cap. Each of these bottles contains 350 ml. of unpasteurized lager beer. These bottles are utilized as the control in the examples. Store these bottles at room temperature (about 15 to 30° C.), periodically (weekly) examining them for microbiological spoilage.

STOCK SOLUTIONS

Various stock solutions are prepared as hereinafter disclosed for use in the examples. The stock solution numbers conform to the corresponding example number.

STOCK SOLUTION NO. I

Dissolve 420 milligrams (mgms.) of n-heptyl para-hydroxybenzoic acid in a sufficient amount of ethanol to make 100 milliliters (ml.) of solution. The addition of 0.5 ml. of this solution, containing 2.1 mgms. of the n-heptyl para-hydroxybenzoate to 350 ml. of beer yields a solution containing 6 p.p.m. of the benzoate.

STOCK SOLUTION NO. V

Dissolve 420 mgms. of octyl gallate in a sufficient amount of ethanol to make 100 ml. of solution. The addition of 0.5 ml. of this solution, containing 2.1 mgms. of the octyl gallate to 350 ml. of beer yields a solution containing 6 p.p.m. of the octyl gallate.

STOCK SOLUTION II–IV AND VI–XIV

In the same manner as for Stock Solutions I and V, additional solutions are made up such that 0.5 ml. of the solution added to 350 ml. of beer yields a solution containing the amounts of materials indicated below.

| Stock solution: | Additive and amount (p.p.m.) |
|---|---|
| II | 8 n-heptyl p-hydroxybenzoate. |
| III | 10 n-heptyl p-hydroxybenzoate. |
| IV | 12 n-heptyl p-hydroxybenzoate. |
| VI | 9 octyl gallate. |
| VII | 12 octyl gallate. |
| VIII | 15 octyl gallate. |
| IX | 18 octyl gallate. |
| X | 21 octyl gallate. |
| XI | 24 octyl gallate. |
| XII | 6 n-heptyl p-hydroxybenzoate, 6 octyl gallate. |
| XIII | 6 n-heptyl p-hydroxybenzoate, 12 octyl gallate. |
| XIV | 6 n-heptyl p-hydroxybenzoate, 18 octyl gallate. |

Example I

Into each of several 12 oz. brown beer bottles place 0.5 ml. of Stock Solution No. I. Fill these bottles from the regular production line with cold, unpasteurized beer. Foam up the beer to expel headspace air, and cap. Each of these bottles contains 350 ml. of the beer together with the stock solution. Store these bottles at room temperature (about 15 to 30° C.), periodically (weekly) examining them for microbial spoilage. Such spoilage may be readily observed by a marked amount of sediment in the beer and by the unpleasant taste and odor produced by microbial growth and metabolism.

Example II

Into each of several 12 oz. brown beer bottles place 0.5 ml. of Stock Solution No. II. Fill these bottles from the regular production line with cold, unpasteurized beer. Foam up the beer to expel headspace air, and cap. Each of these bottles contains 350 ml. of the beer together with the stock solution. Store these bottles at room temperature (about 15 to 30° C.), periodically (weekly) examining them for microbiological spoilage.

Example III

Into each of several 12 oz. brown beer bottles place 0.5 ml. of Stock Solution No. III. Fill these bottles from the regular production line with cold, unpasteurized beer. Foam up the beer to expel headspace air, and cap. Each of these bottles contains 350 ml. of the beer together with the stock solution. Store these bottles at room temperatures (about 15 to 30° C.), periodically (weekly) examining them for microbiological spoilage.

Examples IV to XIV

The same procedure is followed as in the preceding examples with stock solutions IV through XIV.

The following table sets forth the results obtained in the examples.

| Example | (1) n-Heptyl p-hydroxy-benzoate (p.p.m.) | (2) Octyl gallate (p.p.m.) | Sediment¹ reading after— | | | |
|---|---|---|---|---|---|---|
| | | | 4 wks. | 6 wks. | 10 wks. | 18 wks. |
| Control² | 0 | 0 | 9+-9+ | 9+-9+ | 9+-9+ | 9+-9+ |
| I | 6 | 0 | 6-7 | 9+-9+ | 9+-9+ | 9+-9+ |
| II | 8 | 0 | 6-7 | 9+-9+ | 9+-9+ | 9+-9+ |
| III | 10 | 0 | 3-3 | 4-3 | 4-4 | 5-6 |
| IV | 12 | 0 | 3-3 | 4-4 | 4-4 | 5-6 |
| V | 0 | 6 | 9+-9+ | 9+-9+ | 9+-9+ | 9+-9+ |
| VI | 0 | 9 | 3-5 | 6-7 | 9+-9+ | 9+-9+ |
| VII | 0 | 12 | 3-4 | 5-5 | 9+-9+ | 9+-9+ |
| VIII | 0 | 15 | 4-4 | 4-5 | 9+-9+ | 9+-9+ |
| IX | 0 | 18 | 3-4 | 3-4 | 9+-9+ | 9+-9+ |
| X | 0 | 21 | 4-4 | 4-4 | 4-5 | 5-5 |
| XI | 0 | 24 | 3-3 | 3-4 | 4-5 | 5-7 |
| XII | 6 | 6 | 3-3 | 4-4 | 4-4 | 4-5 |
| XIII | 6 | 12 | 4-4 | 4-5 | 4-5 | 5-5 |
| XIV | 6 | 18 | 4-5 | 4-4 | 5-5 | 5-6 |
| Pasteurized control³ | 0 | 0 | 3-3 | 4-5 | 5-6 | 5-6 |

¹ A sediment reading of 9 or above indicates microbial spoilage.
² The control product is beer prepared as in Example I to which no preservative had been introduced.
³ The pasteurized control is beer prepared as in Example I to which no preservative had been introduced and which had been subjected to standard pasteurization treatment.

The results set forth in the table show that 10 p.p.m. of the benzoate alone and 21 p.p.m. of the benzoate alone and 21 p.p.m. of the gallate alone are required to achieve preservation. The beer to which as low as 6 p.p.m. of both of the components have been added is not spoiled even after more than eighteen weeks at which time the tests were discontinued. This establishes the synergistic action obtained when using the combination of the additives.

In producing beer preserved against microbial growth in accordance with this invention in commercial production quantities, the following procedure is followed:

A stock solution is prepared containing the additives in such amount that 8 gal. of the stock solution equally distributed throughout 100 barrels of beer gives the desired concentration of the additives in the beer. The stock solution is injected into the beer pipeline at the desired stage of production of the beer as the beer flows through the line. The rate of injection into the line is correlated to the flow rate of the beer through the line. This proportioning may be achieved through methods known in the art, as for example flow meters. This method insures a thorough admixing of the stock solution with the beer. The beer containing the additive intimately admixed therewith is then filled into botles, cans or kegs, etc.

In a further aspect of the present invention the chill stability of the beer compositions containing para-hydroxybenzoic acid esters and octyl gallate in the amounts indicated are further improved by the addition to the composition of a propylene glycol alginate.

Propylene glycol alginates are per se known and for example are disclosed in U.S. Pat. No. 2,426,125. Any sufficiently soluble propylene glycol alginate, i.e. sufficiently soluble in the beer medium may be used for the purpose of this aspect of the invention. Examples are amply provided in U.S. Pat. No. 2,659,675. The preferred propylene glycol alginate is that prepared by a process disclosed in said Pat. No. 2,659,675. As an example of commercially available propylene glycol alginates which are contemplated within the scope of this invention are Kelcoloid-O and Kelcoloid-L (Kelco Company, San Diego, Calif.), Kelcoloid-L being preferred. As to the amount of propylene glycol alginate to be added, this may amount to as little as 20 parts per million parts of the composition, a preferred range is from about 40 to about 120 parts per million, but an amount as high as 500 parts per million can be used.

The time of addition of the propylene glycol alginate is likewise not particularly critical and may be at any time after the fermentation is complee and before or afer the addition of the benzoate and octyl gallate preservatives. In a preferred embodiment it is added after the first filtration but before the final filtration of the beer.

According to this aspect of the invention (1) individual stock solutions may be prepared containing the predetermined amounts of heptyl para-hydroxybenzoate or salt thereof, of octyl gallate or salt thereof and of propylene glycol alginate; or, (2) stock solutions may be prepared containing the predetermined amounts of any of these elements in any combination. If a production quantity of beer is to be treated, the proper amount of stock solution(s) is added to the beer stream at the desired stage in the plant operation. If laboratory quantities of beer are to be treated, the proper amount of stock solution of heptyl para-hydroxybenzoate or salt thereof and octyl gallate or salt thereof is added to the empty bottle, the unpasteurized finished beer is placed in the package, and the package sealed. After the beer has come to rest, the package is unsealed, the proper amount of the stock solution containing the propylene glycol alginate is added thereto, and the package is resealed and mixed. There is thus provided a beer composition which is preserved against microbial growth and need not be pasteurized or refrigerated and which in addition possesses commercially acceptable chill stability as well as the other properties which are indicative of a commercially acceptable beer.

Example A

Into each of several 12 ounce brown beer bottles place 0.5 ml. of stock solution No. 12. Fill these bottles from the regular production line with cool unpasteurized beer. Further, add to these bottles 0.5 ml. of a stock solution prepared as follows:

Dissolve 2.8 g. of Kelcoloid-L (Kelco Company)—a propylene glycol alginate produced in accordance with a process disclosed in U.S. Pat. No. 2,659,675 and hereinafter referred to as KDL—with vigorous agitation sufficient water to make 100 ml. of solution.

Carefully foam up the beer to expel head space air, and gas. Store these bottles at room temperature (about 15 to 30° C.) and periodically examine them for microbiological spoilage.

Evaluation of these bottles after storage for a period of 18 weeks reveals that the beer compositions are not microbiologically spoiled. Further examination reveals that these beer compositions possess good foam properties and chill stability.

We claim:

1. A composition for use in the microbiological preservation of beer consisting essentially of a mixture of (A) heptyl or octyl para-hydroxybenzoic acid ester or alkali metal or alkaline earth metal salt thereof and (B) octyl gallate or an alkali metal or alkaline earth metal salt thereof, the weight ratio of (A): (B) being about 1–2:1–4..

2. A composition according to claim 1, wherein the ratio of (A):(B) is about 1:1-3.

3. A composition which comprises finished unpasteurized beer containing a mixture of (A) from about 5 to about 6 p.p.m. heptyl para-hydroxybenzoic acid ester or alkali metal or alkaline earth metal salt thereof and (B) from about 5 to about 6 p.p.m. of octyl gallate or an alkali metal or alkaline earth metal salt thereof.

4. A composition according to claim 3 further containing from about 20 to about 120 p.p.m. propylene glycol alginate.

5. A method for microbiologically preserving beer which comprises adding to and mixing with finished unpasteurized beer a mixture of (A) from about 5 to about 6 p.p.m. heptyl para-hydroxybenzoic acid ester or alkali metal or alkaline earth metal salt thereof and (B) from about 5 to about 6 p.p.m. of octyl gallate or an alkali metal or alkaline metal salt thereof.

References Cited
UNITED STATES PATENTS

| | | | |
|---|---|---|---|
| 2,659,675 | 11/1953 | Steiner | 99—48 |
| 3,175,912 | 3/1965 | Strandskov et al. | 99—48 |
| 3,389,999 | 6/1968 | Strandskov et al. | 99—48 |
| 3,490,913 | 1/1970 | Loncin | 99—48 |

DAVID M. NAFF, Primary Examiner

U.S. Cl. X.R.

426—192, 330, 335